US012185042B2

(12) United States Patent
Kallas et al.

(10) Patent No.: US 12,185,042 B2
(45) **Date of Patent: *Dec. 31, 2024**

(54) DUAL-AXIS SWIVEL SPEAKER MOUNT ASSEMBLY

(71) Applicant: Music Express, LLC, Kingston, WA (US)

(72) Inventors: Ryan Kallas, Kingston, WA (US); J. Herschel Blankenship, Kingston, WA (US)

(73) Assignee: MUSIC EXPRESS LLC, Kingston, WA (US)

( * ) Notice: Subject to any disclaimer, the term of this patent is extended or adjusted under 35 U.S.C. 154(b) by 102 days.

This patent is subject to a terminal disclaimer.

(21) Appl. No.: 17/748,372

(22) Filed: May 19, 2022

(65) Prior Publication Data

US 2022/0394366 A1 Dec. 8, 2022

Related U.S. Application Data

(63) Continuation of application No. 29/729,552, filed on Mar. 27, 2020, now Pat. No. Des. 969,113.

(51) Int. Cl.
*H04R 1/02* (2006.01)

(52) U.S. Cl.
CPC ....... *H04R 1/026* (2013.01); *H04R 2201/021* (2013.01); *H04R 2201/025* (2013.01)

(58) Field of Classification Search
CPC .......... H04R 1/026; H04R 1/025; H04R 1/02; H04R 2201/021; H04R 2201/025; F16M 11/04; F16M 11/06; F16M 11/12; F16M 11/125; F16M 11/126; F16M 11/128; F16M 2200/02
USPC ........................................ 381/387, 386, 395
See application file for complete search history.

(56) References Cited

U.S. PATENT DOCUMENTS

| | | | |
|---|---|---|---|
| 1,630,870 | A | 5/1927 | Strunck |
| 2,204,837 | A | 6/1940 | Waller |
| 2,293,593 | A | 8/1942 | Clark |
| 2,565,999 | A | 8/1951 | Julius |
| 2,628,289 | A | 2/1953 | Olson |
| 2,650,788 | A | 9/1953 | Hulstein |
| 2,896,901 | A | 7/1959 | Levy |
| 2,898,068 | A | 8/1959 | Warren |
| 2,922,609 | A | 1/1960 | Collier |
| 2,947,214 | A | 8/1960 | Schwuttke |
| 3,204,898 | A | 9/1965 | Manning |

(Continued)

FOREIGN PATENT DOCUMENTS

EP 0008422240001 12/2007

OTHER PUBLICATIONS

Unpublished U.S. Appl. No. 29/729,552, filed Mar. 27, 2020.

*Primary Examiner* — Ahmad F. Matar
*Assistant Examiner* — Sabrina Diaz
(74) *Attorney, Agent, or Firm* — JK Intellectual Property Law, PA

(57) ABSTRACT

A dual-axis swivel speaker mount assembly includes a base section for attachment to a supporting object, a central section, a speaker section for direct/indirect attachment to a speaker, a first pivot assembly pivotably connecting the base section and the central section, a second pivot assembly pivotably connecting the central section to the speaker section, and two to four securing assemblies for selectively securing the pivot assemblies against rotation.

7 Claims, 7 Drawing Sheets

(56) References Cited

U.S. PATENT DOCUMENTS

D219,033 S 10/1970 Salsgiver
3,661,376 A 5/1972 Hill
3,936,026 A 2/1976 Hampel
3,971,526 A 7/1976 Underwood
4,034,946 A 7/1977 Zimmer, Jr.
4,068,961 A 1/1978 Ebner
4,160,541 A 7/1979 Harken
D253,594 S 12/1979 Antenbring
4,278,223 A 7/1981 Fauteux
4,304,385 A 12/1981 Farouche
4,395,010 A 7/1983 Helgeland
4,470,106 A 9/1984 Norton
D281,317 S 11/1985 Whitaker
4,564,166 A 1/1986 Craft
4,660,493 A 4/1987 Lowry, III
4,690,362 A 9/1987 Helgeland
4,738,422 A 4/1988 Matheson
5,024,415 A 6/1991 Purens
5,092,572 A 3/1992 Litwak
5,201,896 A * 4/1993 Kruszewski ........... F16M 11/10
248/278.1
5,221,070 A 6/1993 Heilmer
D338,882 S 8/1993 Reiter
D362,253 S 9/1995 Vogels
5,497,965 A 3/1996 Mathieu
5,522,527 A 6/1996 Tsai
5,751,548 A 5/1998 Hall
5,931,102 A 8/1999 Grahl
5,957,445 A 9/1999 Hagman
D417,872 S 12/1999 Monson
6,116,554 A 9/2000 Wei
6,161,741 A 12/2000 French
6,244,553 B1 6/2001 Wang
6,505,988 B1 1/2003 Oddsen
6,510,049 B2 1/2003 Rosen
6,517,040 B1 * 2/2003 Wen .................. F16M 11/2064
248/920
6,669,155 B2 12/2003 Ron
D488,708 S 4/2004 Lam
D499,954 S 12/2004 Brushaber
7,028,961 B1 4/2006 Dittmer
D538,633 S 3/2007 LyHau
D539,123 S 3/2007 LyHau
D543,548 S 5/2007 Muday
D552,455 S 10/2007 Moore
D557,126 S 12/2007 Worrall
D595,723 S 7/2009 Bures
D629,405 S 12/2010 Crysell
8,177,208 B2 5/2012 Sato
D679,281 S 4/2013 Kaluza
D753,128 S 4/2016 Anderson
D821,365 S 6/2018 Gheysens
D825,535 S 8/2018 Wright
D865,772 S 11/2019 Theisen
D881,167 S 4/2020 Jiao
D915,359 S 4/2021 Zhang
D952,612 S 5/2022 Malone
2005/0045794 A1 3/2005 Richter
2005/0100187 A1 5/2005 Yang et al.
2007/0012825 A1 1/2007 Yeh
2008/0061199 A1 3/2008 Chen
2009/0308993 A1 12/2009 Chang
2013/0230200 A1 9/2013 Lau et al.
2013/0270317 A1 10/2013 Wang
2014/0061270 A1 3/2014 Richter
2016/0025264 A1 1/2016 Casagrande
2017/0293206 A1 * 10/2017 Wood ................. F16M 11/2021
2019/0368653 A1 12/2019 Olinger

* cited by examiner

DUAL-AXIS SWIVEL SPEAKER MOUNT ASSEMBLY

CROSS-REFERENCE TO RELATED APPLICATIONS

This application is a continuation of and claims benefit to pending U.S. Design Patent Applications No. 29/729,552, filed Mar. 27, 2020, which is incorporated by reference in its entirety herein.

TECHNICAL FIELD

The present disclosure relates generally to assemblies having two swivel axes for securely and adjustably mounting speakers.

BACKGROUND

It can be physically and geometrically challenging to mount loudspeakers to surfaces such as walls or ceilings, or to other supporting structures such as struts or frames. Such mounting is particularly challenging in commercial installations such as music venues, theaters, music and/or video production studios, etc., where speakers may be much heavier and larger in size than those for home use. In locations where multiple speakers are being mounted, it may be desirable to mount individual speakers with a particular orientation or aim (e.g., something other than orthogonal the surface or structure to which it is mounted). An inherent conflict exists in certain adjustable mounting systems between adjustability and security.

Accordingly, improvements in speaker mount assemblies and/or systems addressing one or more of the above drawbacks, and/or providing other benefits, would be welcome.

SUMMARY

According to certain aspects of the disclosure, a dual-axis swivel speaker mount assembly is disclosed for mounting a speaker to a supporting object, the dual-axis swivel speaker mount assembly including, for example, a base section for attachment to the supporting object, a central section, and a speaker section for attachment to the speaker. A first pivot assembly connects the base section and the central section pivotably about a first axis, and a second pivot assembly connects the central section to the speaker section pivotably about a second axis. The second axis is spaced from and aligned in a perpendicular orientation relative to the first axis when viewed from a viewpoint distal to the speaker section and aligned with the first axis and the second axis. The speaker section is selectively orientable relative to the base section by pivoting at least one of the first pivot assembly and the second pivot assembly. A first securing assembly selectively secures the first pivot assembly against rotation, and a second securing assembly selectively secures the second pivot assembly against rotation. Various options and modifications are possible.

For example, the first securing assembly may include a pin on the base section that fits into any of a plurality of openings defined in the first pivot assembly and spaced circumferentially around the first axis. Such openings may be spaced along about 180 degrees around the second axis.

The second securing assembly may include a pin on one of the central section or the speaker section that fits into any of a plurality of openings defined in the other of the central section of the speaker section and spaced circumferentially around the second axis. If so, the pin may be on the central section and the openings may be defined in the speaker section. Such openings may be spaced along about 180 degrees around the second axis.

A third securing assembly may selectively secure the first pivot assembly against rotation, and a fourth securing assembly may selectively secure the second pivot assembly against rotation. The third securing assembly may define a central axis aligned with the first axis, and may further define an axle and a knob. The fourth securing assembly may define a central axis parallel to the second axis, and may further define an axle, a knob, and an arcuate slot through the speaker portion located circumferentially around the second axis.

The base portion may include a base plate defining holes therethrough, two flanges extending upright from the base plate, and an end cap, a portion of the first pivot assembly located within the flanges and the end cap.

The speaker portion may include a speaker plate defining holes and slots therethrough.

According to certain other aspects of the disclosure, a dual-axis swivel speaker mount assembly is disclosed for mounting a speaker to a supporting object including, for example, a base section for attachment to the supporting object, a central section, and a speaker section for attachment to the speaker. A first pivot assembly connects the base section and the central section pivotably about a first axis, and a second pivot assembly connects the central section to the speaker section pivotably about a second axis. The second axis is spaced from and aligned in a perpendicular orientation relative to the first axis when viewed from a viewpoint distal to the speaker section and aligned with the first axis and the second axis. The speaker section is selectively orientable relative to the base section by pivoting at least one of the first pivot assembly and the second pivot assembly. A first securing assembly selectively secures the first pivot assembly against rotation, the first securing assembly including a pin on the base section that fits into any of a plurality of openings defined in the first pivot assembly and spaced circumferentially around the first axis. A second securing assembly selectively secures the second pivot assembly against rotation, the second securing assembly including a pin on the central section that fits into any of a plurality of openings defined in the speaker section and spaced circumferentially around the second axis. Various options and modifications are possible.

According to other aspects of the disclosure, a dual-axis swivel speaker mount assembly is disclosed for mounting a speaker to a supporting object including, for example, a base section for attachment to the supporting object, a central section, a speaker section for attachment to the speaker. A first pivot assembly connects the base section and the central section pivotably about a first axis, and a second pivot assembly connects the central section to the speaker section pivotably about a second axis. The second axis is spaced from and aligned in a perpendicular orientation relative to the first axis when viewed from a viewpoint distal to the speaker section and aligned with the first axis and the second axis. The speaker section is selectively orientable relative to the base section by pivoting at least one of the first pivot assembly and the second pivot assembly. A first securing assembly selectively secures the first pivot assembly against rotation, a second securing assembly selectively secures the second pivot assembly against rotation, a third securing assembly selectively secures the first pivot assembly against rotation, and a fourth securing assembly selectively secures the second pivot assembly against rotation. Again, various options and modifications are possible.

BRIEF DESCRIPTION OF THE DRAWINGS

More details of the present disclosure are set forth in the drawings.

DETAILED DESCRIPTION

Figure 1:
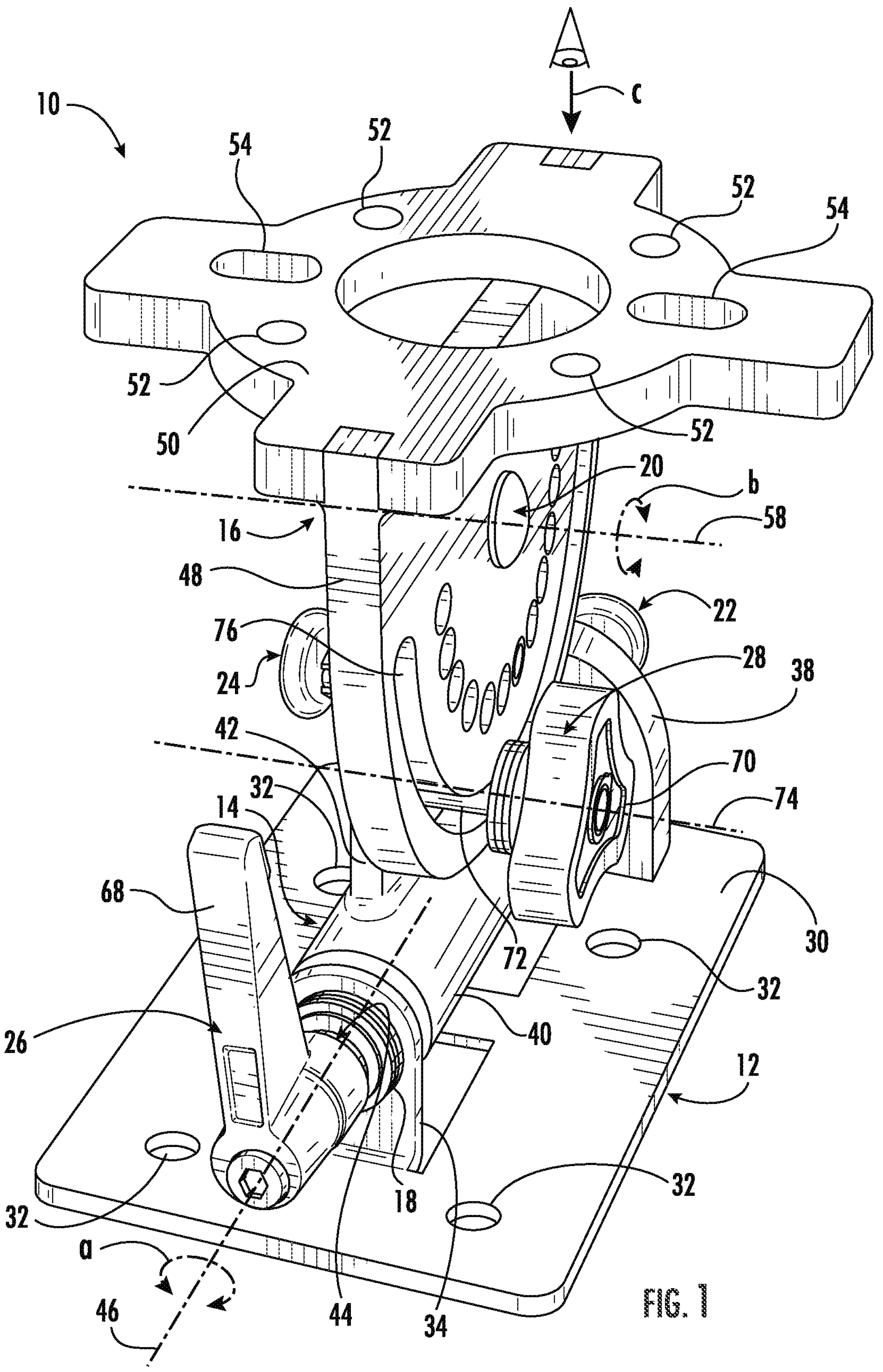
FIG. 1 is a perspective view of a dual-axis swivel speaker mount assembly according to the present design.

Detailed reference will now be made to the drawings in which examples embodying the present disclosure are shown. The detailed description uses numeral and letter designations to refer to features in the drawings. Like or similar designations in the drawings and description have been used to refer to like or similar parts of the disclosure.

Figure 2:
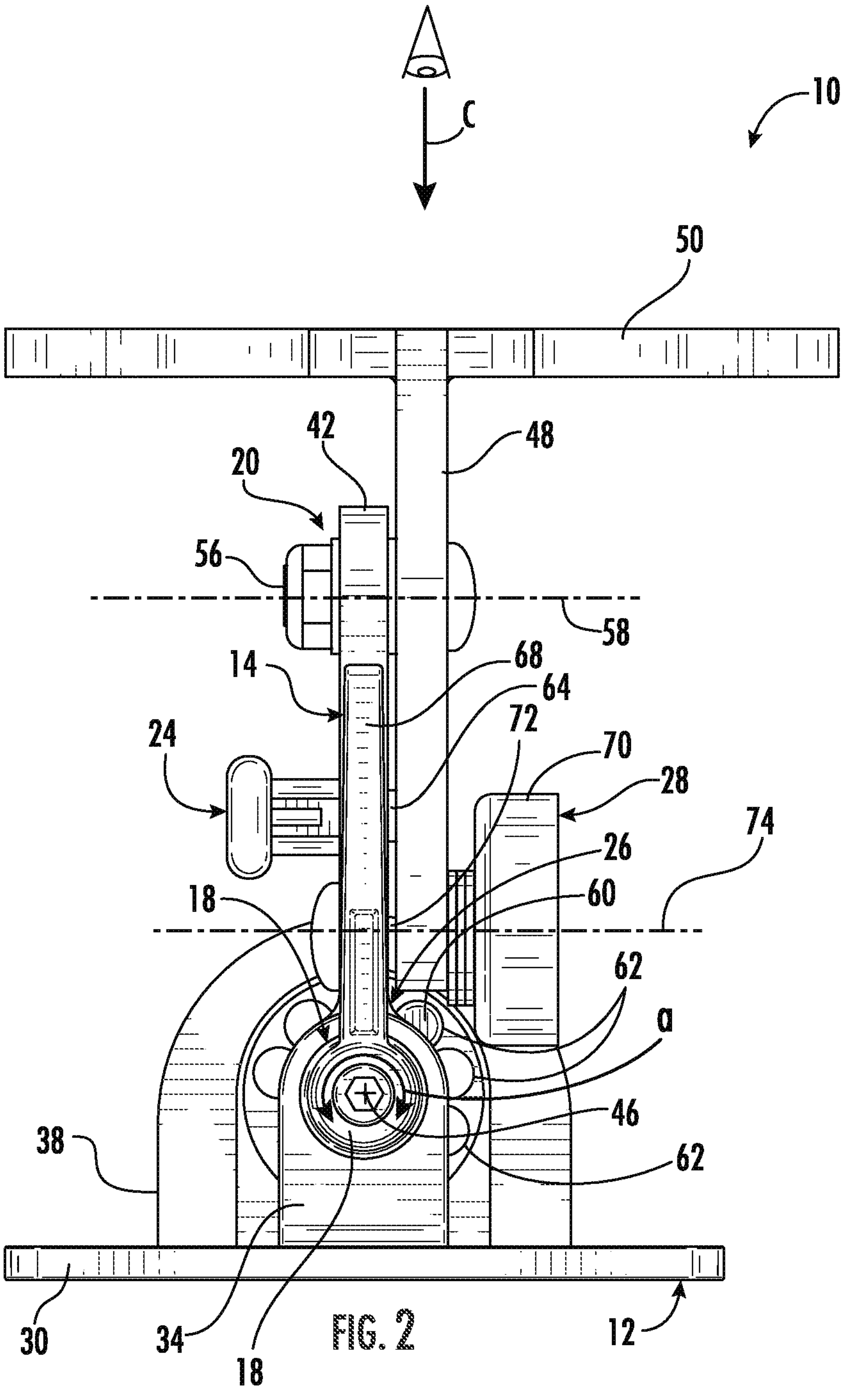
FIG. 2 is a left-side view of the dual-axis swivel speaker mount assembly as shown in FIG. 1.
Figure 3:
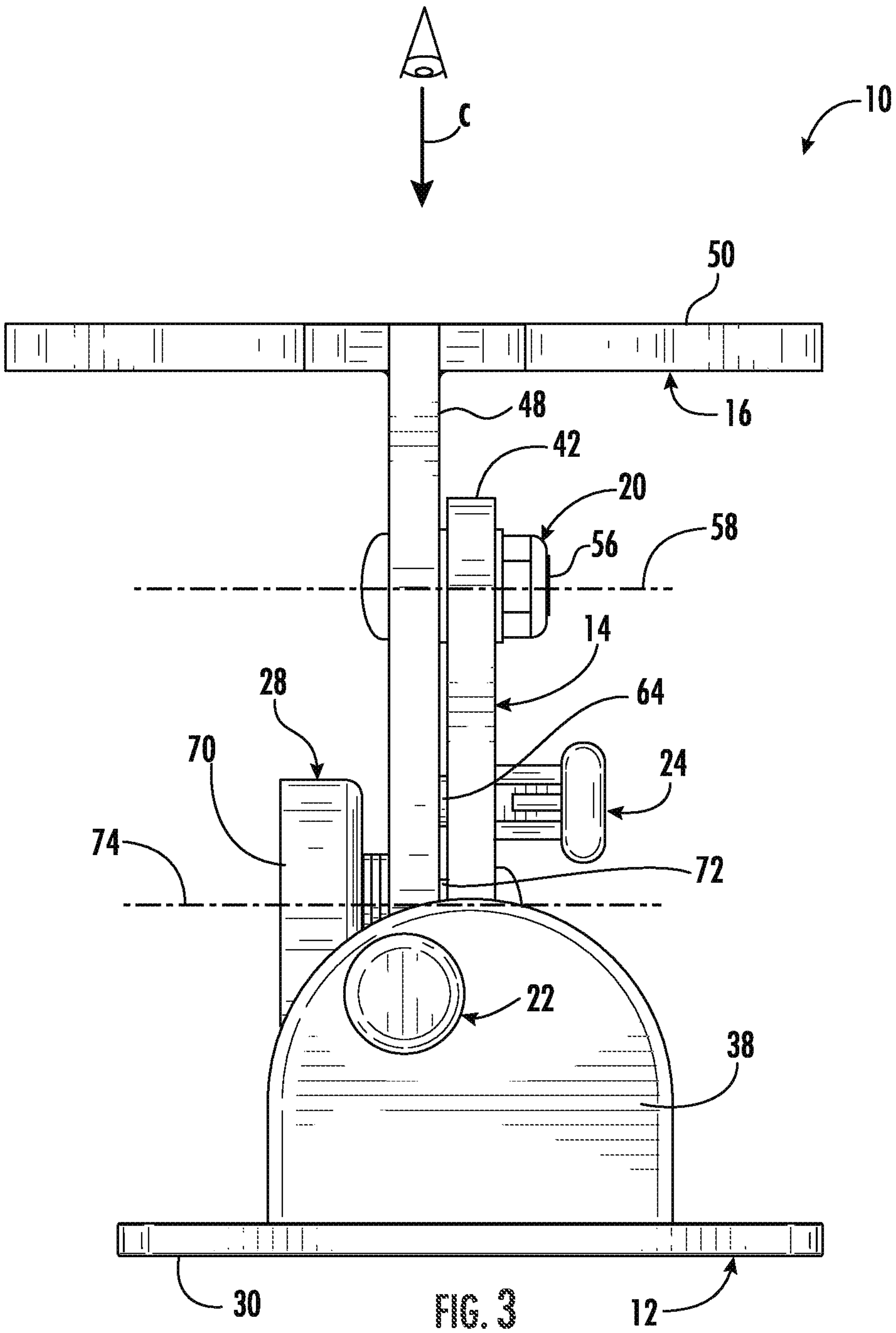
FIG. 3 is a right-side view of the dual-axis swivel speaker mount assembly as shown in FIG. 1.
Figure 4:
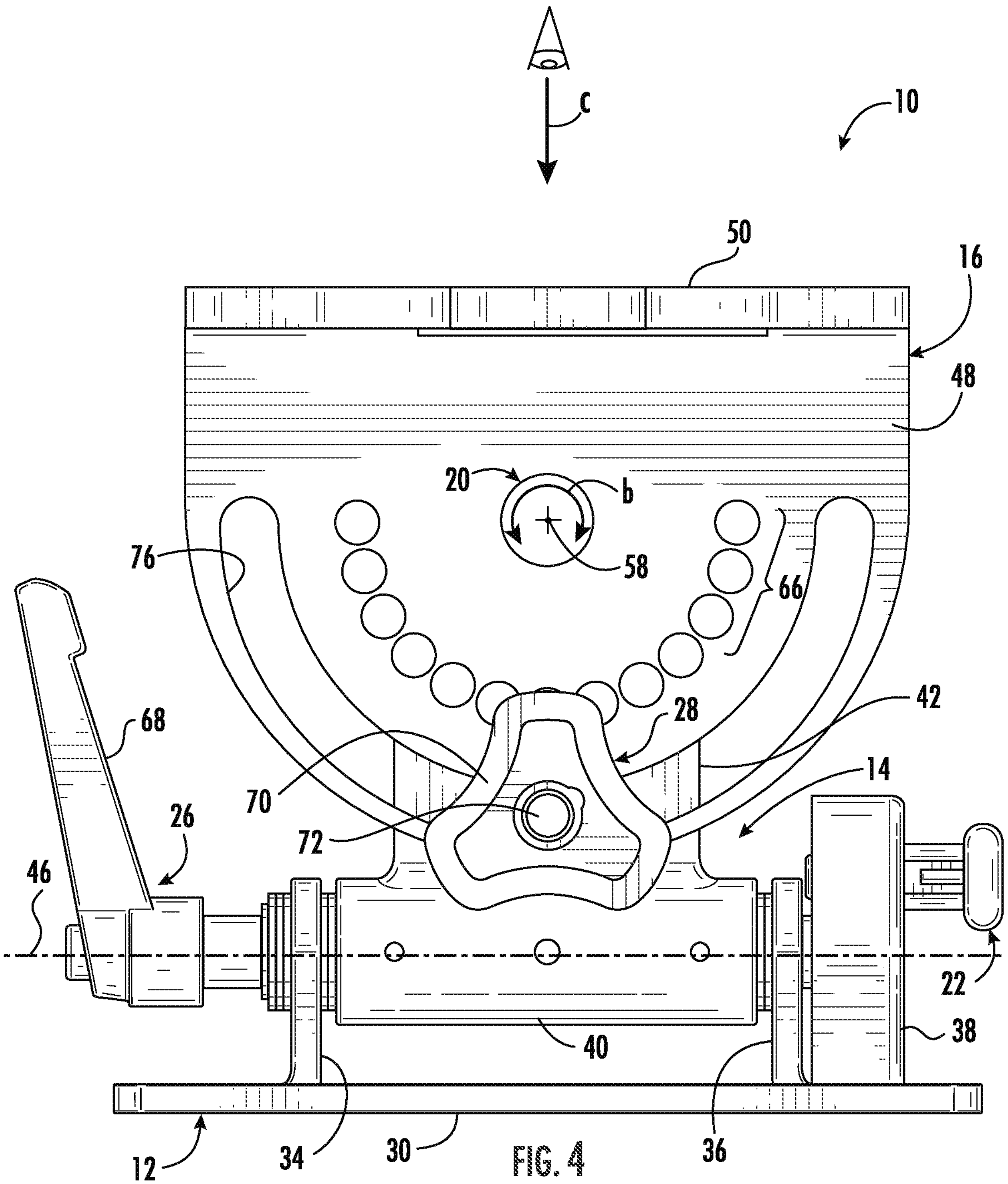
FIG. 4 is a front view of the dual-axis swivel speaker mount assembly as shown in FIG. 1.
Figure 5:
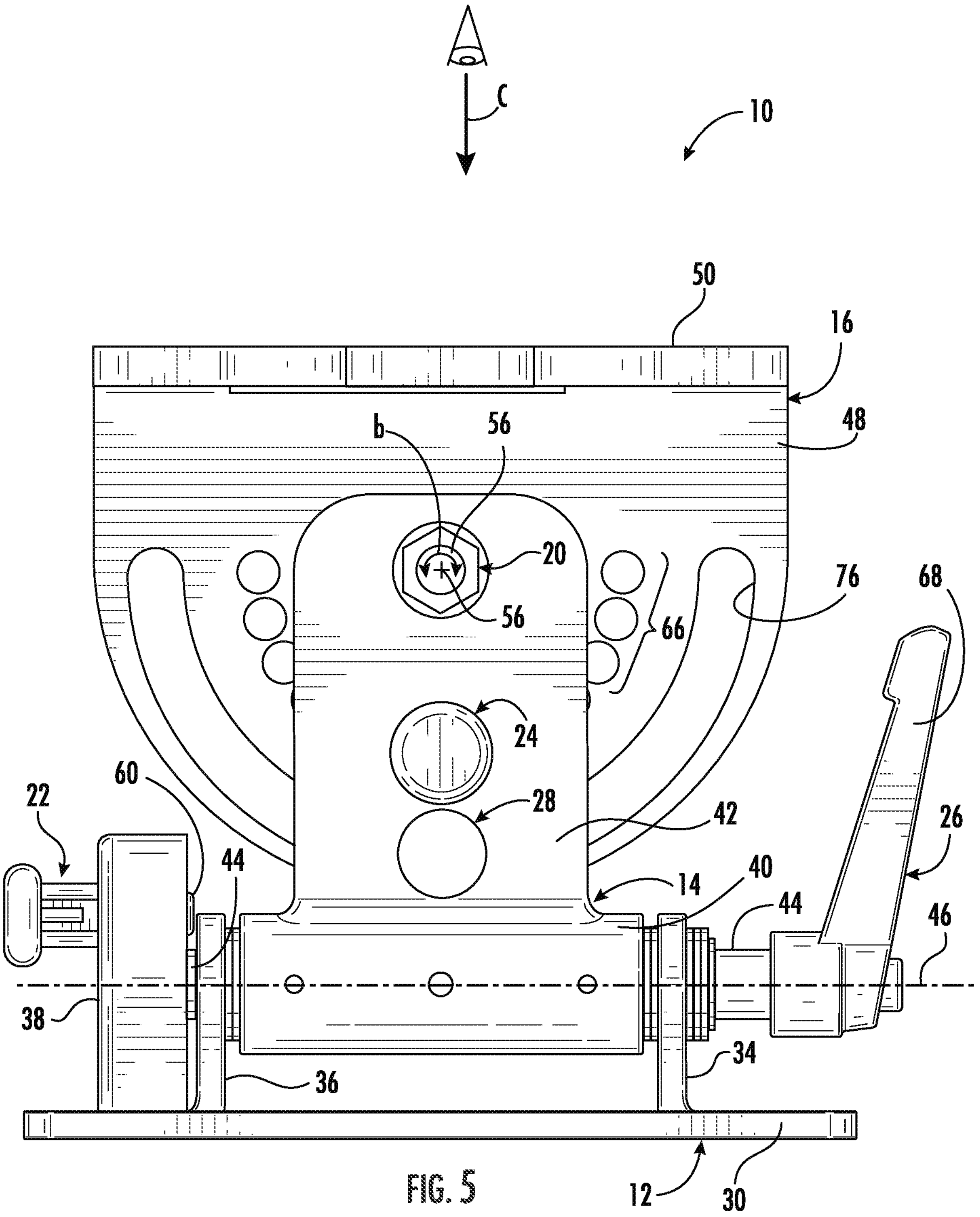
FIG. 5 is a rear view of the dual-axis swivel speaker mount assembly as shown in FIG. 1.
Figure 6:
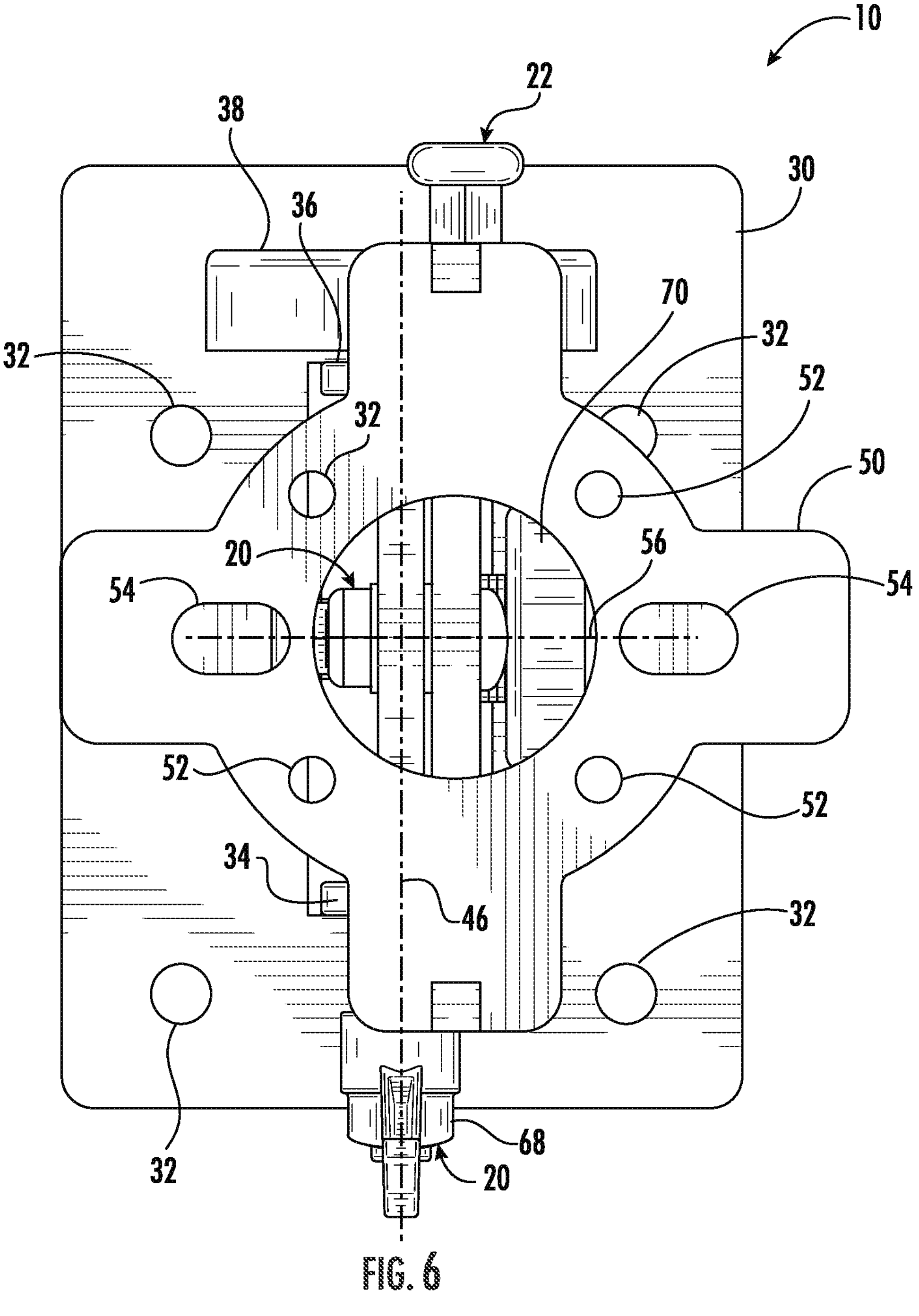
FIG. 6 is a top view of the dual-axis swivel speaker mount assembly as shown in FIG. 1.
Figure 7:
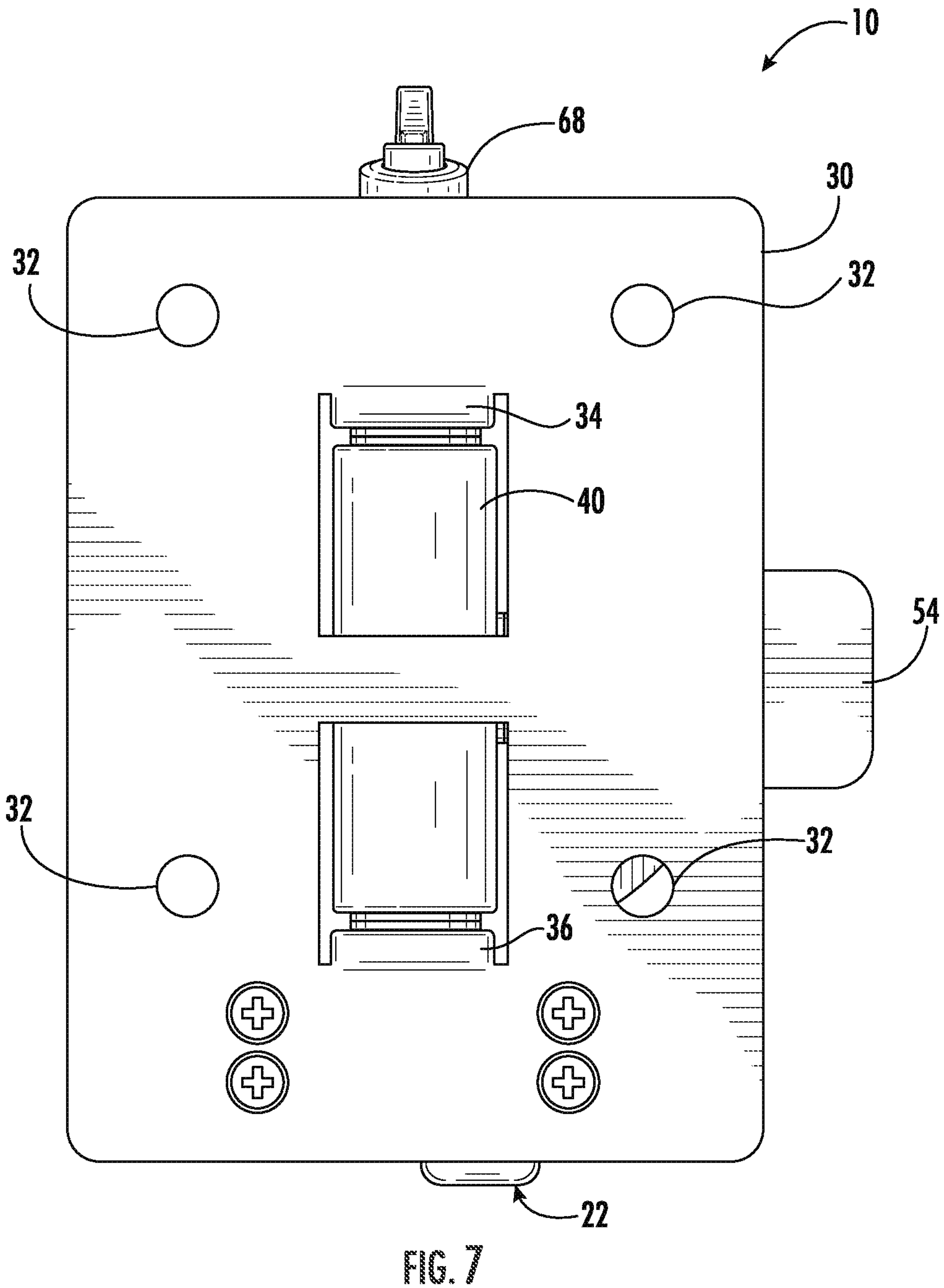
FIG. 7 is a bottom view of the dual-axis swivel speaker mount assembly as shown in FIG. 1.

The drawings and detailed description provide a full and enabling description of the disclosure and the manner and process of making and using it. In general, FIGS. 1-7 show aspects of the subject dual-axis swivel speaker mount assembly as would be required for one of ordinary skill in the art to understand, manufacture, and use the subject matter of this disclosure. Other aspects are described below and are found in the claims that follow. Each depicted and/or disclosed embodiment is provided by way of explanation of the subject matter not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

More particularly, as shown in FIGS. 1-7, one example of a dual-axis swivel speaker mount assembly 10 may include some or all of a base section 12, a central section 14, a speaker section 16, a first pivot assembly 18, a second pivot assembly 20, a first securing assembly 22, a second securing assembly 24, a third securing assembly 26, and a fourth securing assembly 28.

Base section 12 is configured for attachment to a supporting object (not shown), such as a wall, ceiling, frame, support, or other structure, or a mounting bracket attached to a such. Accordingly, as illustrated, base section 12 has a base plate 30 defining holes 32 therethrough. Base section 12 also has two flanges 34,36 extending upright (as shown) from base plate 30, and an end cap 38 adjacent flange 36 also extending upright.

Central section 14 has a cylindrical portion 40 and a plate portion 42. First pivot assembly 18 includes an axle 44 extending through flanges 34,36 and cylindrical portion 40 with an end in end cap 38. First pivot assembly 18 allows central section 14 to pivot (arrow a) relative to base section 12 around a first axis 46, which is also the central axis of axle 44.

Speaker section 16 has a plate portion 48 and a speaker plate 50 portion for attachment to a speaker (not shown) or to bracket or other mounting hardware for mounting to a speaker (directly or indirectly) via holes 52 and/or slots 54. Second pivot assembly 20 includes an axle 56 extending through plate portions 42 and 48. Second pivot assembly 20 allows speaker section 16 to pivot (arrow b) relative to central section 14 around a second axis 58, which is also the central axis of axle 56.

The first and second axes 46,58 extend in spaced-apart planes, and would appear to be oriented perpendicularly to each other when viewed from a viewpoint (along arrow c in the Figures, or the viewpoint of FIG. 6) distal to speaker section 16 and aligned with the first and second axes. Speaker section 16 is selectively orientable relative to base section 12 by pivoting (arrows a and/or b) at least one of first and second pivot assembly 18,20.

First securing assembly 22 includes a pin 60 on base section 12 (end cap 38) that fits into any of a plurality of openings 62 in end of axle 44 extending radially within end cap 38. Openings 62 are spaced circumferentially around about 180 degrees of first axis 46 (see FIG. 2). First securing assembly 22 selectively secures first pivot assembly 18 against rotation about first axis 46, to thereby secure central section 14 relative to base section 12.

Second securing assembly 24 includes a pin 64 on central section 14 (plate portion 42) that fits into any of a plurality of openings 66 in plate portion 48 of speaker section 16. Openings 66 are spaced circumferentially around about 180 degrees of second axis 58 (see FIGS. 1 and 4). Second securing assembly 24 selectively secures second pivot assembly 20 against rotation about second axis 58, to thereby secure central section 14 relative to speaker section 16. If desired, pin 64 may instead be on plate portion 48 and openings 66 may be on plate portion 42 (reversing previously-discussed arrangement).

Third securing assembly 26 defines a knob 68 on axle 44 tightenable for selectively securing first pivot assembly 18 against rotation. First and third securing assemblies 22,26 both therefore secure central section 14 in a desired orientation, defined by pin 60/opening 62 selections, relative to base section 12.

Fourth securing assembly 28 defines a knob 70 on axle 72 tightenable for selectively securing second pivot assembly 20 against rotation. Second and fourth securing assemblies 24,28 both therefore secure speaker section 16 in a desired orientation, defined by pin 64/opening 66 selections, relative to central section 14. Axle 72 has a central axis 74 and is spaced from axle 56 and its (parallel) axis 58. Axle 72 as shown extends through arcuate slot 76 circumferentially extending around axis 58 in plate portion 48 of speaker section 16. However, knob 70 could instead be mounted on axle 56 instead of axle 72, similar in some ways to the arrangement of knob 68 on axle 44.

The above structure thus provides one or more examples of a dual-axis swivel speaker mount assembly that could be used to mount a speaker to a support structure in a desired orientation, pivotable about two axes relative to the base/support, and reliably securable in the desired orientation.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

The invention claimed is:

1. A dual-axis swivel speaker mount assembly for mounting a speaker to a supporting object, the dual-axis swivel speaker mount assembly comprising:

a base section for attachment to the supporting object, the base section including a base plate defining holes therethrough, two flanges extending upright from the base plate, and an end cap;

a central section;

a speaker section for attachment to the speaker;

a first pivot assembly connecting the base section and the central section pivotably about a first axis, a portion of the first pivot assembly located within the flanges and the end cap of the base section;

a second pivot assembly connecting the central section to the speaker section pivotably about a second axis, the second axis being spaced from and aligned in a perpendicular orientation relative to the first axis when viewed from a viewpoint distal to the speaker section and aligned with the first axis and the second axis, the speaker section being selectively orientable relative to the base section by pivoting at least one of the first pivot assembly and the second pivot assembly;

a first securing assembly for selectively securing the first pivot assembly against rotation, the first securing assembly including a pin having a graspable head on a first side of the base section that fits into any of a plurality of openings defined in the first pivot assembly and spaced circumferentially along about 180 degrees around the first axis;

a second securing assembly for selectively securing the second pivot assembly against rotation, the second securing assembly including a pin having a graspable head on a first side of the central section that fits into any of a plurality of openings defined in the second pivot assembly and spaced circumferentially along about 180 degrees around the second axis;

a third securing assembly for selectively securing the first pivot assembly against rotation, the third securing assembly defining a central axis aligned with the first axis, and including an axle and a knob, the knob being tightenable for the selective securement of the third securing assembly, the knob being located on a second side of the base section opposite the first side of the base section; and a fourth securing assembly for selectively securing the second pivot assembly against rotation, the fourth securing assembly defining a central axis parallel to but spaced from the second axis, the fourth securing assembly including an axle, a knob, and an arcuate slot through the speaker portion located circumferentially around the second axis, the knob being tightenable for the selective securement of the fourth securing assembly, the knob being located on a second side of the central section opposite the first side of the central section.

2. The dual-axis swivel speaker mount assembly of claim 1, wherein the central axis of the fourth securing assembly is between the second axis and the base plate of the base section.

3. The dual-axis swivel speaker mount assembly of claim 1, wherein the first pivot assembly, the first securing assembly, and the third securing assembly are configured together so that the third securing assembly must be loosened and the first securing assembly must have its pin disengaged from the openings in the first pivot assembly before the first pivot assembly may be pivoted.

4. The dual-axis swivel speaker mount assembly of claim 1, wherein the second pivot assembly, the second securing assembly, and the fourth securing assembly are configured together so that the fourth securing assembly must be loosened and the second securing assembly must have its pin disengaged from the openings in the second pivot assembly before the second pivot assembly may be pivoted.

5. The dual-axis swivel speaker mount assembly of claim 1, wherein the openings in the second securing assembly are defined in the speaker section.

6. The dual-axis swivel speaker mount assembly of claim 1, wherein the speaker section includes a speaker plate defining holes and slots therethrough.

7. The dual-axis swivel speaker mount assembly of claim 1, wherein the speaker section includes a pivot plate through which the second axis passes, the pivot plate being permanently attached to the speaker plate at a 90 degree angle.

* * * * *